United States Patent [19]

Murase et al.

[11] 4,289,272

[45] Sep. 15, 1981

[54] TEMPERATURE CONTROL APPARATUS

[75] Inventors: Fujio Murase; Hidenosuke Matsumoto, both of Kusatsu; Hiroshi Fujieda, Kashihara; Teruhisa Takano, Osaka; Kenichiro Imasu, Shiga, all of Japan

[73] Assignee: Matsushita Electric Industrial Co., Ltd., Kadoma, Japan

[21] Appl. No.: 23,237

[22] Filed: Mar. 23, 1979

[30] Foreign Application Priority Data

| Mar. 31, 1978 [JP] | Japan | 53/38373 |
| Apr. 3, 1978 [JP] | Japan | 53/39402 |
| Apr. 3, 1978 [JP] | Japan | 53/39403 |
| Apr. 3, 1978 [JP] | Japan | 53/39404 |

[51] Int. Cl.³ .................. G05D 23/00; F25B 29/00
[52] U.S. Cl. ........................ 236/91 D; 62/160; 165/28
[58] Field of Search ............. 62/160; 236/91 R, 91 D, 236/91 G; 165/26, 28

[56] References Cited

U.S. PATENT DOCUMENTS

| 2,598,397 | 5/1952 | Levine | 165/28 X |
| 2,917,702 | 12/1959 | Steghart et al. | 236/91 G X |
| 3,188,553 | 6/1965 | Eurenius | 236/91 E X |
| 3,761,018 | 9/1973 | Rekai | 236/91 D |
| 4,023,949 | 5/1977 | Ferry | 62/180 |
| 4,089,462 | 5/1978 | Bradford | 236/91 R X |

Primary Examiner—William E. Wayner
Assistant Examiner—Harry Tanner
Attorney, Agent, or Firm—Wenderoth, Lind & Ponack

[57] ABSTRACT

This invention is directed to a temperature control apparatus for an air-conditioning apparatus which does not require a manual operation in controlling the temperature of a house room relative to the outdoor temperature. The control apparatus utilizes a micro-computer having a linear function stored thereon. The control of the indoor temperature is carried out by calculating the desired indoor temperature using the linear function of outdoor temperature and controlling the air-conditioning apparatus using the desired indoor temperature.

10 Claims, 15 Drawing Figures

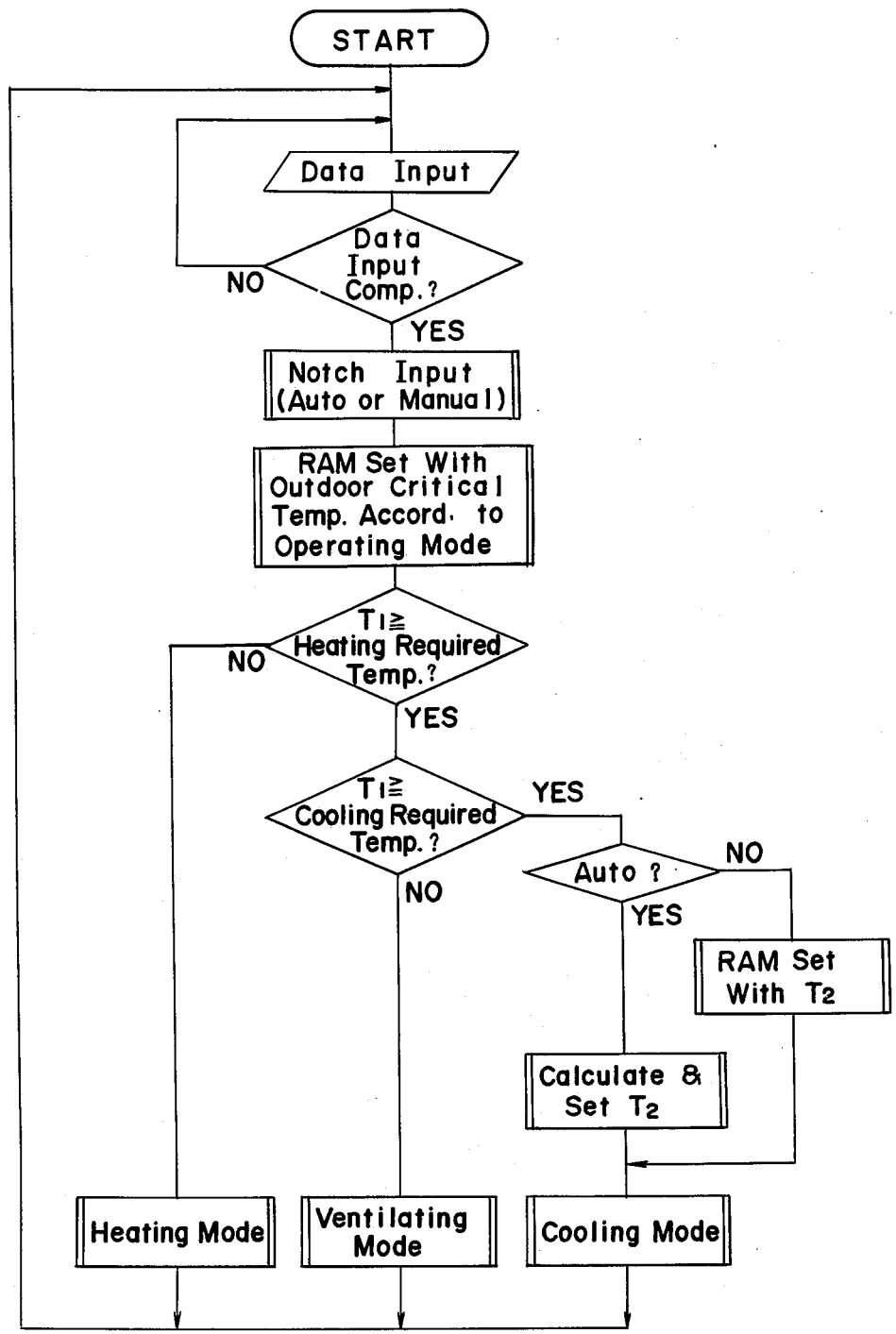

TEMPERATURE CONTROL APPARATUS

BACKGROUND OF THE INVENTION

The present invention generally relates to a temperature control apparatus for an air-conditioning apparatus having cooling and heating modes of operation, which utilizes a microcomputer for maintaining a generally comfortable temperature at all times within a space to be air-conditioned.

In general, the temperature within a space to be air-conditioned, for example, a house room, (this temperature being hereinafter referred to as "indoor temperature") which is considered comfortable to most people, varies with a variation of the temperature outside the space to be air-conditioned, that is, the outdoor temperature. By way of example, when the outdoor temperature is 35° C., 23° C., or 20° C., the indoor temperature of 27° C., 23° C., or 20° C., respectively, is considered comfortable, and the indoor climatic condition acceptable to most people has heretofore been published by some experts concerned.

When operating an air-conditioning apparatus having cooling and heating modes of operation, (that is, an air-conditioning apparatus of the dual purpose type which can serve as a heat pump, the operator of the air-conditioning apparatus utilizes his sensory perception to determine whether the air-conditioning apparatus is to be operated in a heating mode or whether it is to be operated in a cooling mode. Moreover, whether the air-conditioning apparatus is operated in the heating mode or in the cooling mode, the user manipulates a temperature adjustment of the air-conditioner, in dependence upon a sensory perception of the temperature prevalent within the house room in which he or she lives, to central the air-conditioner so as to create an acceptable indoor climatic condition.

Since the temperature control used in most conventional air-conditioners of a similar kind operates on the basis of an absolute temperature control principle, the indoor climatic condition, particularly the indoor temperature, created by the dual purpose air-conditioner is determined by the setting of the temperature control irrespective of variation in outdoor temperature. This often results in excessive cooling or heating of the house room.

Not only does the excessive heating or cooling of the house room adversely affect physical conditions of some or all of occupants in the house room, but also it results in a waste of electric power in view of the fact that the air-conditioner is operated to provide energies in excess of the amount required to establish an acceptable indoor temperature.

The above described drawback would be substantially eliminated if the temperature at which the temperature control of the dual purpose air-conditioner operates is made variable according to a variation of the outdoor temperature. The arrangement necesssary to achieve this involves complications and, therefore, has not yet been practised in the control of air-conditioners.

SUMMARY OF THE INVENTION

Accordingly, the present invention has for its essential object to provide a temperature control apparatus which utilizes a micro-computer, which stores information concerning a desired indoor temperature relative to the outdoor temperature, for effecting a control of the indoor temperature appropriate with respect to the outdoor temperature.

Another important object of the present invention is to provide a temperature control apparatus of the type referred to above, wherein the micro-computer is stored with a linear function of $(y = ax + b)$, wherein y and x represent a desired indoor temperature and the outdoor temperature, respectively, a coefficient a and a constant b being so suitably selected as to enable the automatic control of the indoor temperature appropriate with respect to the outdoor temperature.

A further object of the present invention is to provide a temperature control apparatus of the type referred to above, wherein the values of one or both of the coefficient a and the constant b of the primary function stored in the micro-computer are changed by the adjustment of an indoor temperature adjustment so that a desired temperature control effect can be obtained.

A still further object of the present invention is to provide a temperature control apparatus of the type referred to above, wherein the temperature control is provided with a manual-auto selecting means so that, depending upon the position of the manual-auto selector means, the indoor temperature can be automatically controlled to a value appropriate to the outdoor temperature or the indoor temperature can be controlled as desired, irrespective of the outdoor temperature.

A still further object of the present invention is to provide a temperature control apparatus of the type referred to above, wherein the selection of one of the heating and cooling modes under which the air-conditioner can operate is carried out automatically by means of the micro-computer.

A still further object of the present invention is to provide a temperature control apparatus of the type referred to above, wherein the indoor temperature control can automatically be performed to a desired indoor temperature when the outdoor temperature becomes higher or lower than a predetermined temperature.

A still further object of the present invention is to provide an air-conditioning apparatus of the type referred to above, wherein the micro-computer is also utilized to control the air-conditioner so as to operate under a ventilating only mode when the outdoor temperature remains within a predetermined range of temperature.

BRIEF DESCRIPTION OF THE DRAWINGS

These and other objects and features of the present invention will become apparent from the following description taken in conjunction with a preferred embodiment thereof with reference to the accompanying drawings, in which:

FIG. 14 is a flow chart showing a command system of the micro-computer; and

DETAILED DESCRIPTION OF THE INVENTION

Figure 1:
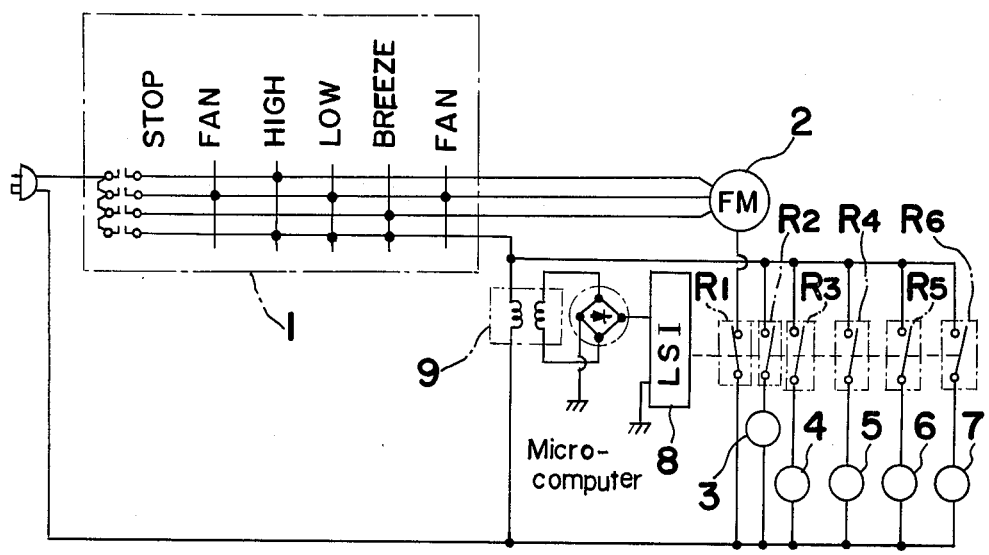
FIG. 1 is a schematic electric circuit diagram showing an electric circuit employed in an air-conditioning apparatus embodying the present invention.

Before the description of the present invention proceeds, it is to be noted that like parts are designated by like reference numerals throughout the accompanying drawings.

Referring to FIG. 1, reference numeral 1 represents a manual switch assembly, reference numeral 2 represents a fan motor installed in an indoor unit IN (FIG. 15) of an air-conditioner, reference numeral 3 represents a compressor, reference numeral 4 represents a fan motor installed in an outdoor unit OUT (FIG. 15) of the air-conditioner, reference numeral 5 represents a 4-way valve for changing the direction of flow of a coolant to render the air-conditioner to be selectively operated under heating and cooling modes, reference numeral 6 represents a ventilating device including a ventilating damper 6b (FIG. 15), and reference numeral 7 represents an auxiliary electric heater for providing an additional source of heat during the heating of a space to be air-conditioned, for example, a house room. While the fan motor 2, the compressor 3, the fan motor 4, the electromagnetic device 5, the ventilating device 6 and the auxiliary electric heater 7 are electrically connected in parallel to each other, they are electrically connected in series with respective relay switches R1, R2, R3, R4, R5 and R6. Each of these relay switches R1 to R6 is operatively associated with a micro-computer 8 so that the closure and opening of the corresponding relay switch can be controlled by the micro-computer according to cooling, heating, dehumidifying and ventilating programs stored in the micro-computer 8, the details of the programs and those of the micro-computer 8 being described later. Reference numeral 9 represents a transformer which serves as an electric power source for the micro-processor 8 and to which a diode bridge circuit 10 is electrically connected for converting an alternating current into a direct current.

The details of the air-conditioner having the indoor and outdoor units IN and OUT, to which the present invention is applied, will now be described with particular reference to FIG. 15.

Figure 15:
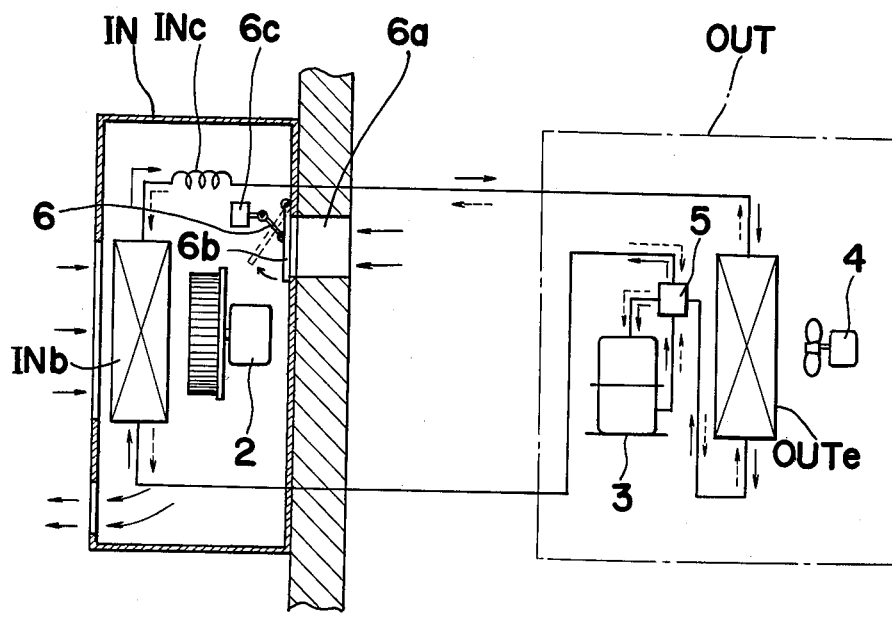
FIG. 15 is a schematic diagram showing the air-conditioner to which the present invention is applicable.

Referring now to FIG. 15, the indoor unit IN includes, in addition to the fan motor 2 and the ventilating device 6, an indoor heat-exchanger INb and an expansion device INc comprised of a capillary tube. So far illustrated, the ventilator damper 6b is pivotally supported for selectively opening and closing a ventilating hole 6a, defined in a wall partitioning between the outside and inside of the house room, so that air can be sucked into and discharged from the house room forcibly by the fan motor 2. For the ventilator damper 6b to selectively open and close the ventilating hole 6a, a solenoid unit 6c is used, the supply of an electric power to the solenoid unit 6c being controlled by the relay switch R5.

On the other hand, the outdoor unit OUT includes, in addition to the compressor 3, the fan motor 4 and the 4-way valve 5, an outdoor heat-exchanger OUTe. All of the components of the outdoor unit OUT concurrently serve as a heat pump. Accordingly, it will readily be seen that, during the heating mode, the heat-exchanger OUTb serves as a cooling device while, during the cooling mode, the heat-exchanger OUTb serves as a heating device.

It is to be noted that the ventilating device 6 may not be limited to a type having the pivotally supported damper 6b, but may be constituted by an electrically driven fan. Where the electrically driven fan is used for the ventilating device 6, it may be installed either in the indoor unit IN such as shown or separately of the indoor unit IN in operative relation with the indoor unit IN. Furthermore, the ventilating device 6 may not be limited to a type capable of sucking fresh air into the house room, but may be of a type capable of discharging contaminated air from the house room to the outside thereof. Where the fan motor 2 or a separate ventilator motor is of a reversible type, it will readily be seen that the concurrent sucking of fresh air into the house room and the discharging of contaminated air to the outside of the house room can be achieved.

The construction of the dual purpose air-conditioner, (that is, the air-conditioner having both heating and cooling capabilities), is well known to those skilled in the art and, therefore, further detailed description thereof is herein omitted for the sake of brevity; however, the air-conditioner is operated in a novel manner which will now be described.

Figure 12:
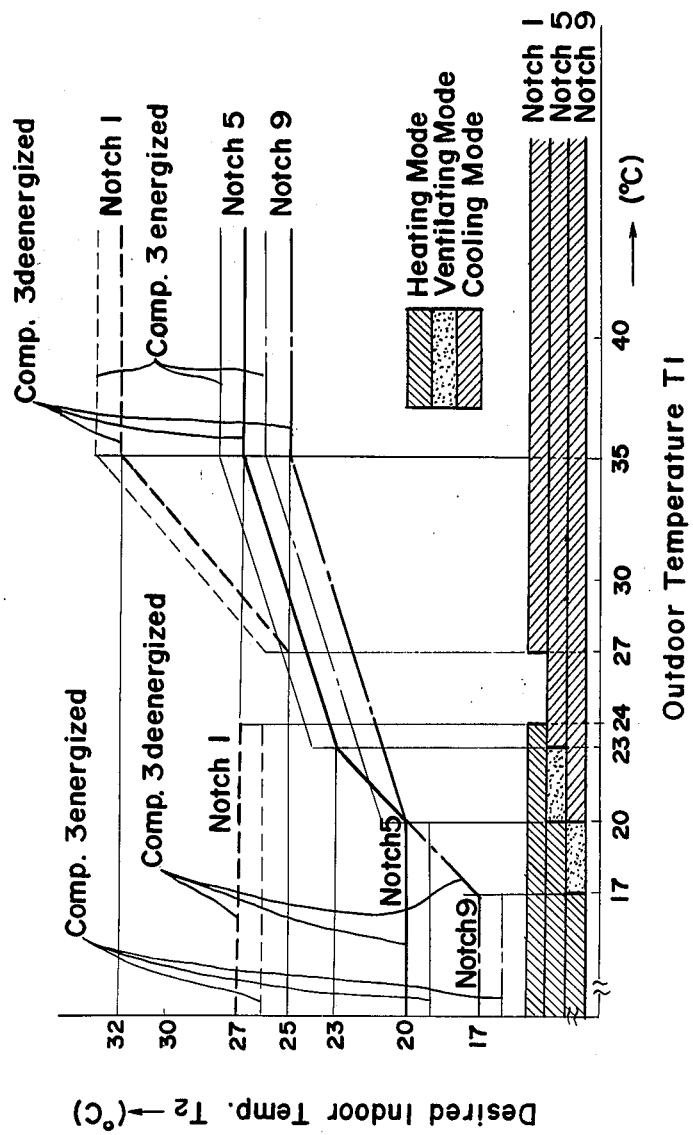
FIG. 12 is a graph showing an automatic temperature control characteristic of the temperature control.

When the manual switch assembly 1 is switched on, the micro-processor 8 starts its operation according to the program stored therein to control the supply of electric power to any one of the fan motor 2, the compressor 3, the fan motor 4, the 4-way valve 5, the ventilating device 6 and the auxiliary electric heater 7. The supply of electric power to any one of the fan motor 2, the compressor 3, the fan motor 4, the 4-way valve 5, the ventilating device 6 and the auxiliary electric heater 7 is determined by the micro-computer 8 each time the outdoor temperature varies, the micro-computer 8 thereby controlling the supply of electric power to one or more of the fan motor 2, compressor 3, fan motor 4, 4-way valve 5, ventilating device 6 and auxiliary electric heater 7 to thereby control the air-conditioner so as to create an acceptable indoor climatic condition inside the house room. Specifically, the micro-computer 8 is so designed as to operate to give such a characteristic as shown in FIG. 12, (that is, to heat or cool the house room automatically until the indoor temperature attains a desired indoor temperature relative to the prevalent outdoor temperature). It is to be noted that the characteristic graph shown in FIG. 12 was prepared by the present inventors on the basis of largely well known information concerning the indoor climatic condition acceptable to most people relative to the prevalent outdoor temperature.

Considering the scheme of operation of the air-conditioner as described above, since the temperature control is automatically performed, it is necessary for the user of the air-conditioner to be informed of the type of operating mode of the air-conditioner. For this purpose, a suitable indicator is installed at a location which can be viewed by the user, for example, at a control panel.

The arrangement of the control panel of the air-conditioner will now be described with particular reference to FIG. 2.

The control panel installed in a housing for the indoor unit IN of the air-conditioner includes a manipulatable rotory switch 1a of any well known construction for manually controlling the operation of the indoor fan motor 2, and an indoor temperature adjustment having a plurality of temperature adjustment notches respectively numbered one to nine and an adjustment knob 1b selectively movable to any one of the adjustment notches one to nine. The indoor temperature adjustment is provided for selecting desired indoor temperature to which the house room is to be cooled or heated. This indoor temperature adjustment may be of any known type, for example, a push-button arrangement or a rotary switch arrangement, but is of a slide switch arrangement for illustrative purposes. It will readily be seen that, when the adjustment knob 1b is moved to the left as viewed in FIG. 2, a high desired indoor temperature can be selected while, when the adjustment knob 1b is moved to the right as viewed in FIG. 2, a low desired indoor temperature can be selected. It will also be seen that, when the temperature adjustment knob 1b is positioned intermediately of the temperature adjustment scale, that is, held at notch five as shown by the hatched area, the air-conditioner can operate to automatically control the indoor temperature according to the characteristic curve appropriate to the notch five as shown in FIG. 12, the system of which will be described later.

The control panel further includes the indicator comprised of three indicator lamps L1, L2 and L3 which, when turned on, indicate the cooling, ventilating and heating modes, respectively, under which the air-conditioner is operated, and a manual-auto switch 1c having an auto position, wherein the temperature control is effected automatically by the micro-processor 8, and a manual position wherein the temperature control is effected on the absolute temperature control principle in a conventional manner according to the operating state of an indoor thermostat (not shown).

Figure 3:
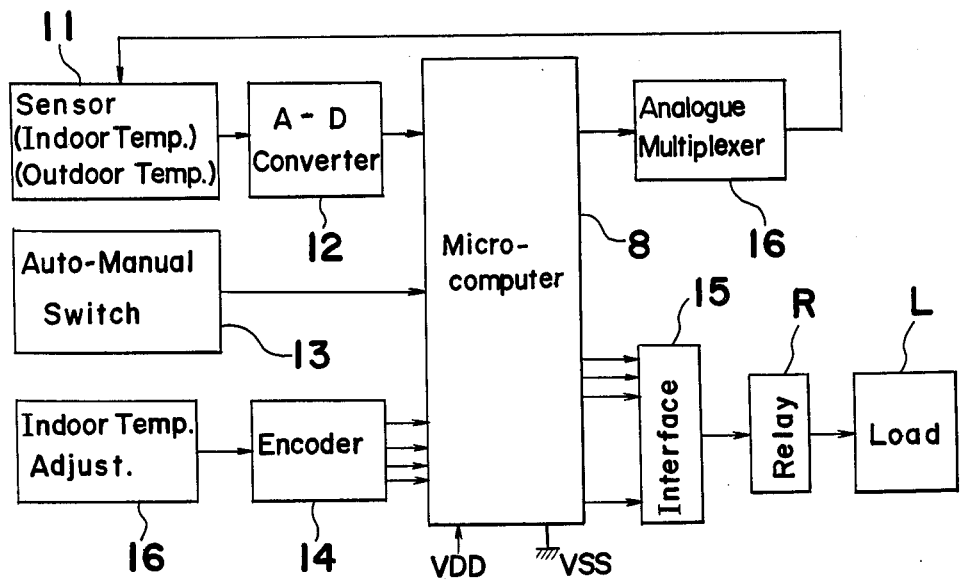
FIG. 3 is a block diagram of a temperature control apparatus for an air-conditioning apparatus.
Figure 4:
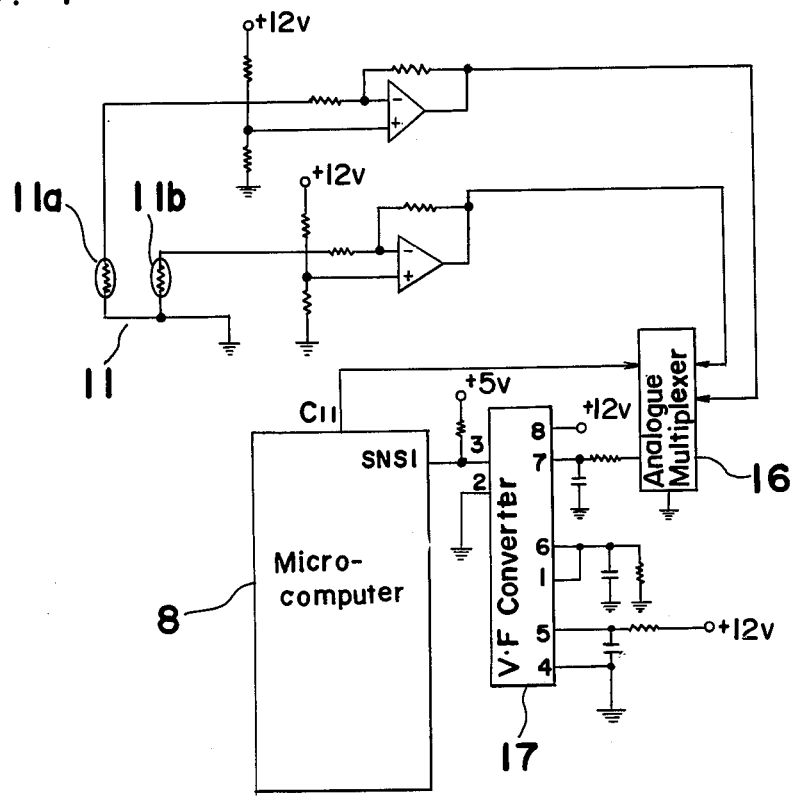
FIG. 4 is a circuit diagram showing the details of a portion of the block diagram shown in FIG. 3.
Figure 5:
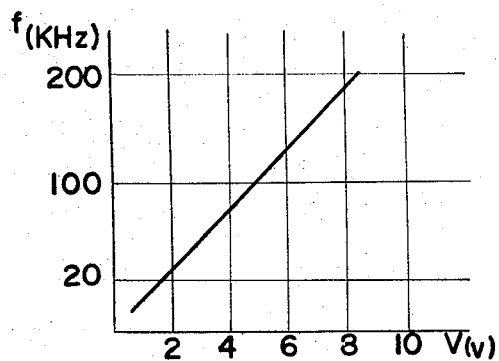
FIG. 5 is a graph showing a voltage-to-frequency conversion characteristic of a V-F converter shown in FIG. 4.

Referring now to FIG. 4 showing the micro-processor 8 and the details of some of their accompanying circuit components shown in FIG. 3, the accompanying circuit components include a temperature sensor unit 11, comprised of a pair of temperature sensors 11a and 11b, for example, thermistors, for detecting the indoor and outdoor temperatures, respectively, an A-D converter 12 for converting an analog signal outputted from the sensor unit 11 through an analogue multiplexer 16 into a digital signal to be inputted to the micro-computer 8, the conversion characteristic of which is shown in FIG. 5, an auto-manual switching circuit 13 which may be itself the auto-manual switch 1c or may include the auto-manual switch 1c as shown and which serves to fed an electric signal indicative of the position of the auto-manual switch 1c to the micro-computer 8, and an encoder 14 for receiving an input signal indicative of the position of the indoor temperature adjustment knob 1b and for feeding an output signal to the micro-computer 8.

As shown in FIG. 3, the micro-computer 8 has some of its output terminals electrically connected to interface circuits 15 which receive information concerning a decision made by the micro-computer 8 and actuates one or more of the relay switches R1 to R8 according to the contents of the information received from the micro-computer 8. It is to be noted that, for the sake of brevity, a group of the relay switches R1 to R6 shown in FIG. 1 and a group of the electric components such as designated by 2, 3, 4, 5, 6 and 7 in FIG. 1 are hereinafter referred to as a relay switch circuit R and a load circuit L, respectively, as shown in FIG. 3. In any event, when the relay switch circuit R is so actuated in the manner described above, the load circuit L can be energized.

The analogue multiplexer 16 is connected to an output terminal of the micro-computer 8 and selects as an input to the A-D converter either the signal indicative of the indoor temperature (hereinafter referred to as "indoor temperature signal") or the signal indicative of the outdoor temperature (hereinafter referred to as "outdoor temperature signal"). Specifically, the analogue multiplexer 16 is so designed that, when an input signal to the analogue multiplexer 16 is in a high level state, the indoor temperature signal is outputted while, when the input signal to the multiplexer 16 is in a low level state, the outdoor temperature signal can be outputted. It is to be noted that reference characters $V_{DD}$ and $V_{SS}$ respectively represent the source of electric power supplied to the micro-computer and its corresponding ground.

A concrete circuit arrangement of a portion of the block diagram shown in FIG. 3 is illustrated in FIG. 4. Referring to FIG. 4, an output signal from the sensor unit 11, the magnitude of which varies according to a variation in resistance which takes place in a proportional relationship to a variation in temperature sensed by sensors 11a and 11b, is converted into an electric voltage by operational amplifiers 12A and 12B. The outputs of amplifiers 12A and 12B are applied to the analogue multiplexer 16. The analogue multiplexer 16 is operable in response to the output signal fed from the output terminal $C_{11}$ of the micro-computer 8 to select either the voltage corresponding to the outdoor temperature represented by the outdoor temperature signal fed thereto from the temperature sensor unit 11b through amplifier 12B and the voltage corresponding to the indoor temperature represented by the indoor temperature signal fed thereto from the temperature sensor unit 11a through amplifier 12A. The selected voltage is subsequently fed to the V-F converter 17 forming part of the A-D converter 12. This V-F converter 17 serves to convert the analog signal (voltage) from the multiplexer 16 into a digital signal (frequency) which is supplied to the input terminal $SNS_1$ of the micro-computer 8. The signal fed to the input terminal $SNS_1$ of the micro-computer 8 is subjected to a temperature-frequency conversion by a counter (not shown in FIG. 4, but referred to later) built in the micro-computer 8.

Figure 6:
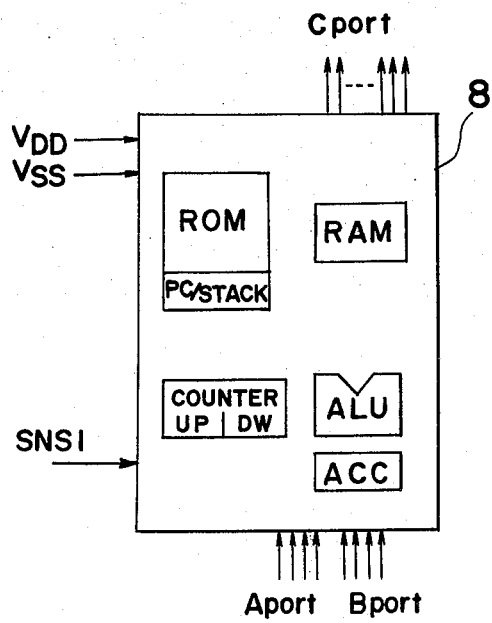
FIG. 6 is a schematic diagram showing a micro-computer employed in the air-conditioning apparatus.

Referring to FIG. 6, there is illustrated the micro-computer 8. The micro-computer 8 has an A port, which serves as the input terminals, a B port, which also serves as the input terminals, and a C port, which serves as the output terminals. (It is noted that the micro-computer 8 further has ports other than the A, B and C ports, which are not shown.) The micro-computer 8 comprises a read-only memory ROM which stores a control program as will be described later and generates a command signal, a random access memory RAM for storing date necessary to control the system, an arithmetic logic unit ALU for discriminating, according to the data type the, data stored in the random access memory RAM, a registor ACC for handling the data to be processed during the operation of the micro-computer 8, and a counter COUNTER for effecting the temperature-frequency conversion subject to the input pulses fed to the terminal $SNS_1$. In any event, the detailed construction of the micro-computer 8 is well known to those skilled in the art and, therefore, it will be described only briefly in terms of its operation.

All of the input signals entering through the A port and B port and the input terminal $SNS_1$ are stored in the random access memory RAM.

An output signal indicative of the decision made by the micro-computer 8 is outputted from the C port. According to the type of the output signal outputted from the micro-computer 8 through the C port, various drive components of the air-conditioning apparatus are controlled, the manner of control of the air-conditioning apparatus being described later.

The manner by which the various drive components of the air-conditioner are controlled will now be described with particular reference to FIG. 7. It is, however, noted that, in FIG. 7, a circuit arrangement necessary for operation during the ventilating mode of operation is shown by way of example. Reference characters $C_1$ and $C_2$ represent two of the C port terminals of the micro-computer 8. As shown, only two of the relay switches, that is, the relay switches R1 and R5 operatively associated with the indoor fan motor 2 and the ventilating device 6 for driving the latter, are shown. Reference numeral 18 represents a light emitting diode which is switched on during the operation of the air-conditioner under the ventilating mode to show the ventilating mode of the air-conditioner. This light emitting diode 18 constitutes the indicator lamp $L_3$ shown in FIG. 2.

Figure 7:
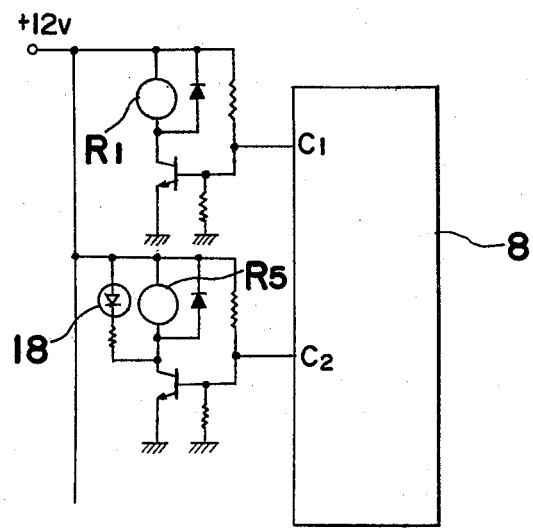
FIG. 7 is a schematic electric circuit diagram showing the operational relationship between the micro-computer and other circuit components used in the temperature control.

In this circuit arrangement shown in FIG. 7, when a command to operate the air-conditioner in the ventilating mode is issued by the micro-computer 8, output signals from the terminals $C_1$ and $C_2$ of the micro-computer 8 are applied through respective switching circuits to the relay switches R1 and R5 to close the latter so that the indoor fan motor 2 and the ventilating device 6 can be driven.

It is noted that a similar operation takes place during the heating or cooling mode of operation of the air-conditioner and this can readily be understood when the relay switch R5 shown in FIG. 7 is replaced with a corresponding relay switch or switches, the relay switch R1 being, however, closed during any one of the operating modes of the air-conditioner. However, where the ventilating device 6 is of a type comprising a separate ventilating fan, the supply of the electric power to the ventilating device 6 during the ventilating mode can be interrupted.

Figure 8:
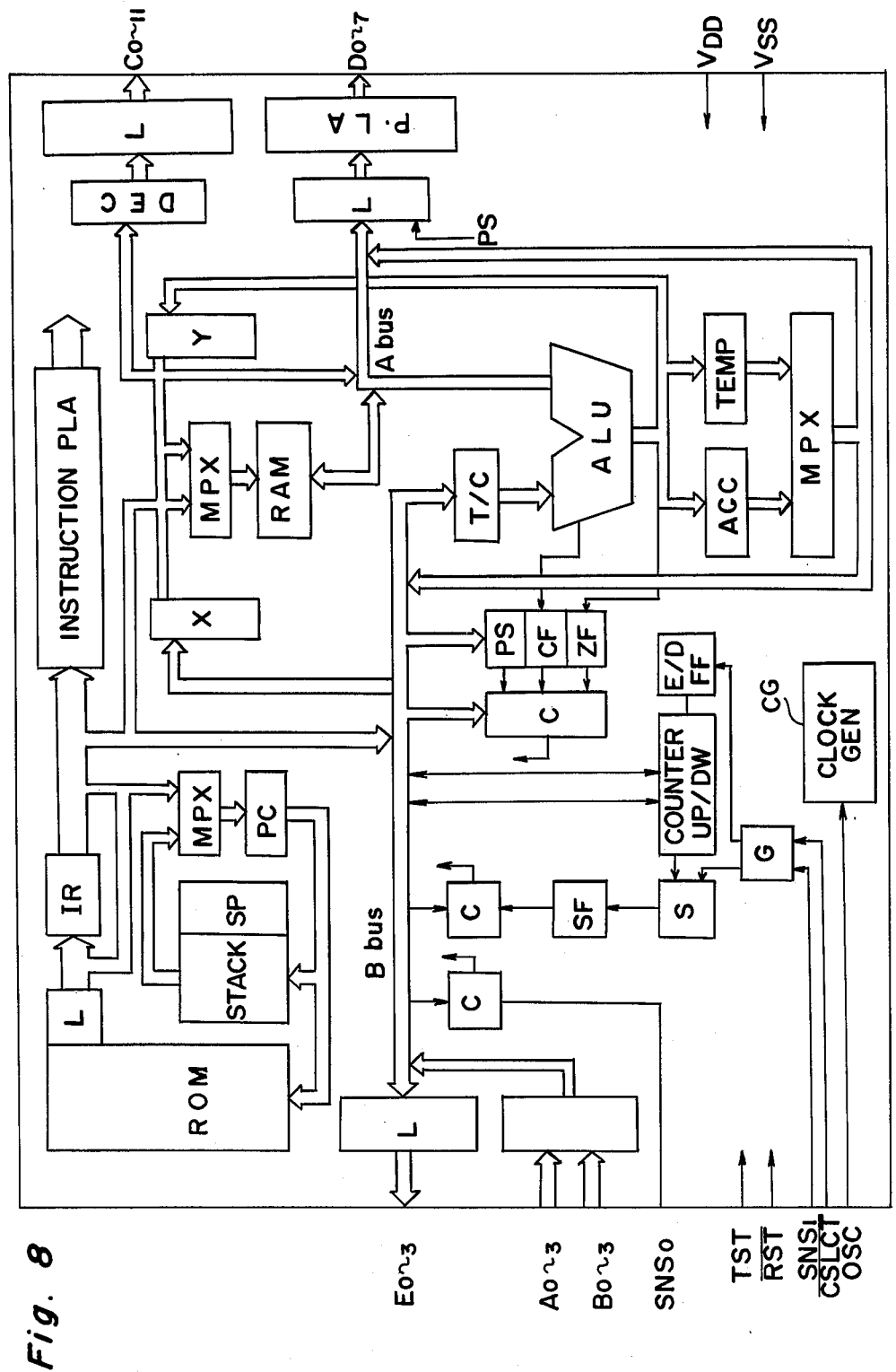
FIG. 8 is a flow chart showing a pattern of the flow of electric signals in the micro-computer.

The various controls performed by the micro-computer 8 of the construction described above will now be described with reference to a chart of FIG. 8 showing the flow of various signals in the domain of the micro-computer 8.

Referring to FIG. 8, various commands, for example, a command necessary to operate the air-conditioner in the heating mode, a command necessary to operate the air-conditioner in the ventilating mode and a command necessary to operate the air-conditioner in the cooling mode, are stored respectively at predetermined addresses in the read-only memory ROM together with other commands accessory to these commands which are also stored at predetermined addresses. By way of example, one of these accessory commands may be the one necessary to operate the compressor intermittently. The other commands not mentioned above will occassionally be described in the subsequent description. The random access memory RAM is occasionally stored with various data necessary to control the operation of the air-conditioner, for example, data concerning the outdoor temperature, the indoor temperature and the operating conditions of the indoor fan motor, compressor and other drive components of the air-conditioner. The arithmetic logic unit ALU serves as a comparator for comparing the command from the read-only memory ROM with the data stored in the random access memory RAM according to the data type and, according to the result of the comparison made by the arithmetic logic unit ALU, the read-only memory ROM generates a command signal appropriate to the results of the comparison. By way of example, if the outdoor temperature stored in the random access memory RAM and the temperature stored in the read-only memory ROM are compared with each other and if the result of such comparison shows that the outdoor temperature is lower than the temperature information stored in the read-only memory ROM, then the latter can issue a command signal to operate the air-conditioner in the heating mode. Reference characters PS, CF and ZF represent respective flags operable to determine whether or not the data respectively stored in the random access memory RAM and the read-only memory ROM, which are compared by the arithmetic logic unit ALU, coincide with each other and, depending upon the result of such determination, the read-only memory ROM again generates a different command signal. One example is the command signal to operate the air-conditioner in the heating mode as described above. It is noted that, since the flag PS has no concern with the temperature control, the details thereof are herein omitted for the sake of brevity.

Figure 11:
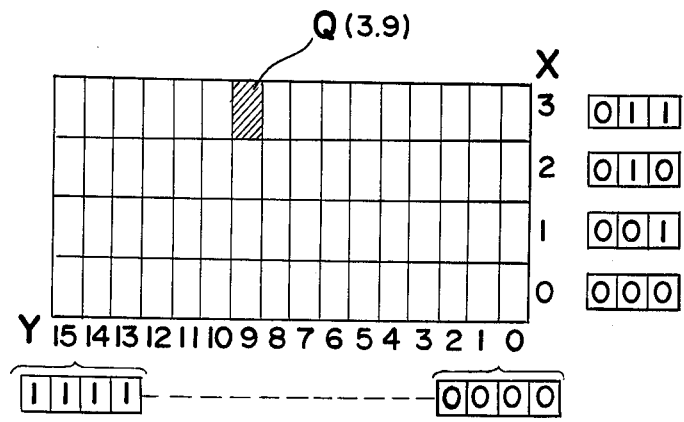
FIG. 11 is an explanatory diagram showing words stored in a random access memory used in the micro-computer.

Reference characters C represent respective comparators each operable to compare two input signals with each other and to apply to the read-only memory ROM an output signal indicative of the result of such comparison. Reference character ACC represents an accumulator operable to process various data. The counter COUNTER is operable to convert the input pulses into an electric signal indicative of the temperature, which signal is applied to the random access memory RAM as one of the input data of the memory RAM. Reference character CG represents a clock pulse generator for generating a train of clock pulses necessary to control the timing of the operation of various electric circuit components of the micro-processor 8. Reference characters X and Y represent an X-register and a Y-register each operable to determine a particular address Q of the random access memory RAM where an input signal fed from an external circuit is stored. Specifically, as shown in FIG. 11, the random access memory RAM has a plurality of addresses and each input signal fed thereto from the external circuit is stored at a particular addresses determined jointly by the X-register X and the Y-register Y.

Other components respectively identified by "STACK", "SP", "MPX", "PC", "IR", "S", "G", "SF", "E/DFF", "T/C", "DEC", "L", "TEMP" and "INSTRUCTION PLA" in FIG. 8 are peculiar to a micro-computer and, because they do not have any concern with the temperature control according to the present invention, the description thereof is herein omitted for the sake of brevity.

The micro-computer shown in FIG. 8 has the input and output as hereinbefore described, the input including the 4-bit A port $A_0$, $A_1$, $A_2$ and $A_3$, the 4-bit B port $B_0$, $B_1$, $B_2$ and $B_3$ and the various input terminals $SNS_0$, $SNS_1$, CSLCT, TST, RST, OSC, $V_{DD}$ and $V_{SS}$. The output includes the 12-bit C port $C_0$, $C_1$, $C_2$, ... $C_{10}$ and $C_{11}$, the 8-bit D port $D_0$, $D_1$, $D_2$, ... $D_6$ and $D_7$, and the 4-bit E port $E_0$, $E_1$, $E_2$ and $E_3$.

Figure 9:
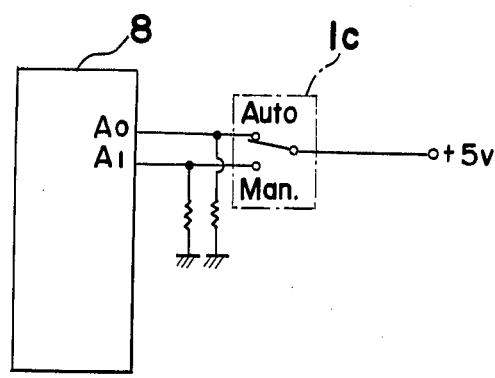
FIG. 9 is a schematic electric circuit diagram showing a manual-auto selector switch.
Figure 13:
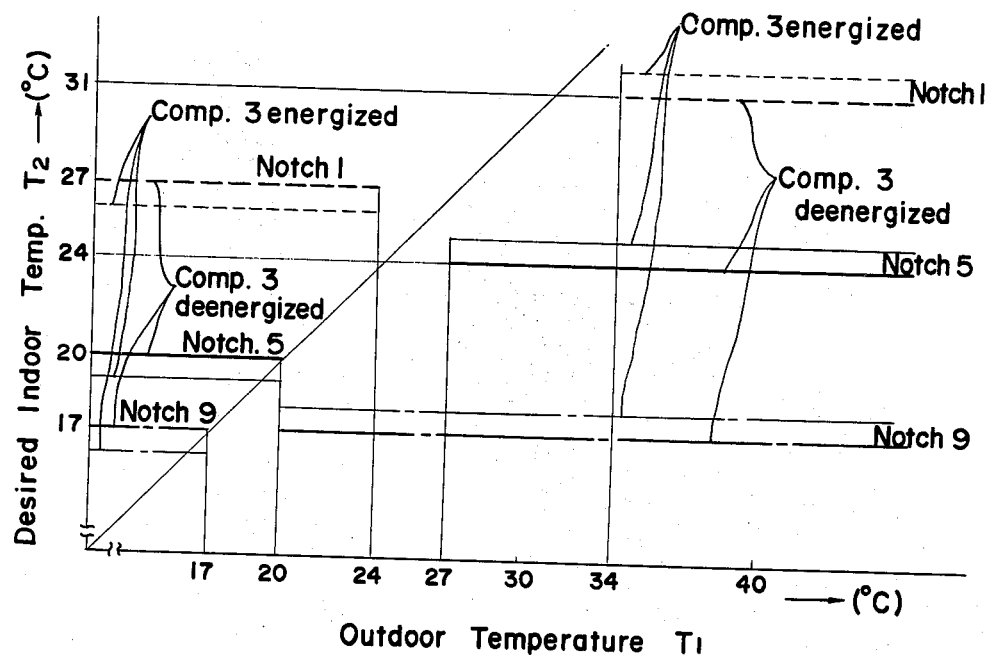
FIG. 13 is a graph showing a manual temperature control characteristic of the temperature control.

Each of the input and output terminals of the micro-computer 8 will now be described. As shown in FIG. 9, the input terminals $A_0$ and $A_1$ are electrically connected to the manual-auto switch 1c, an electric signal indicative of the manual position of the switch 1c being applied to terminal $A_1$ while an electric signal indicative of the auto position of the switch 1c is applied to the terminal $A_0$. Depending upon the set position of the switch 1c, the micro-computer 8 provides either automatic or manual capabilities. If the manual-auto switch 1c is set to the auto, as shown in FIG. 9, air-conditioning is performed according to the characteristic as shown in FIG. 12, whereas if the same switch 1c is set to the manual position, air-conditioning is performed according to such a characteristic as shown in FIG. 13, as will be described in more detail latter.

Figure 10:
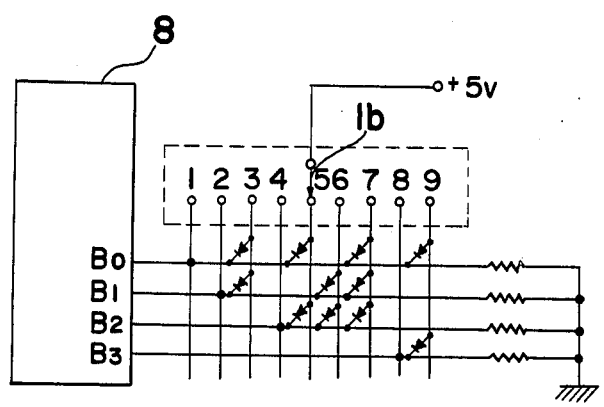
FIG. 10 is a schematic circuit diagram showing an electric connection between the micro-computer and an indoor temperature adjustment.

As shown in FIG. 10, an electric signal indicative of the position of the knob 1b of the indoor temperature adjustment is applied in the form of a combination of binary-coded signals to the B port of the microcomputer 8. These binary-coded signals are in turn indicative of one of the characteristic curves of FIG. 12 which has been selected by the user to operate the air-conditioner to according to one of the characteristic curves. It is noted that the number of the indoor temperature adjustment notches is not limited to the nine shown, but may be smaller or greater than nine. It will readily be seen from FIG. 10 that, since the B port is comprised of four input terminals, the position of the knob 1b at a particular adjustment notch can be expressed by binary-coded signals in the following manner.

| Notch #1 | 0001 |
|---|---|
| Notch #2 | 0010 |
| Notch #3 | 0011 |
| Notch #4 | 0100 |
| Notch #5 | 0101 |
| Notch #6 | 0110 |
| Notch #7 | 0111 |
| Notch #8 | 1000 |
| Notch #9 | 1001 |

Upon receipt of this binary coded signal from the indoor temperature adjustment in the manner described above, the read-only memory ROM issues an appropriate command signal to operate the air-conditioner in a particular operating mode. The input terminal $SNS_1$ is, as hereinbefore described, adapted to receive an electric signal, the frequency of which is proportional to the digital signal indicative of either the indoor and outdoor temperature and which has been converted from the analog signal by the A-D converter 12 in the manner described with particular reference to FIGS. 3 and 4. It is noted that, for the sake of brevity, the electric signal applied to the input terminal $SNS_1$ will hereinafter be referred to as the indoor or outdoor temperature signal. The input terminal RST represents a reset terminal to which a reset signal is applied, when the power supply switch of the air-conditioner is turned on, for resetting the address of the read-only memory ROM to enable the latter to generate the command signals in sequence from the address number zero. The input terminal OSC is representative of an input terminal of the clock pulse generator CG.

Each of the output terminals of the micro-computer 8 will now be described. To some of the terminals of the 12-bit C port of the micro-computer 8, the relay switches R1 to R6 respectively connected so far as the embodiment shown is involved. It is noted that, instead of the C port, the relay switches R1 to R6 may be connected to either the D port or the E port. However, since the read-only memory ROM determines the group of output ports from which the output signal is to be issued, the description of the D port and E port is herein omitted fo the sake of brevity.

The temperature control performed by the micro-computer 8 will now be described with particular reference to FIGS. 1, 3, 8, 12, 14 and 15.

Figure 2:
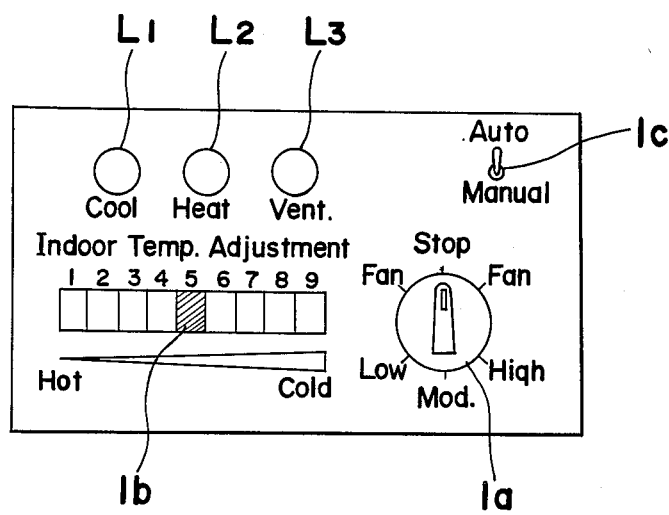
FIG. 2 is a schematic front elevational view of a control panel employed in the air-conditioning apparatus embodying the present invention.

Assuming that the manual-auto switch 1c is set to the auto position and the knob 1b is set to notch number five as shown in FIGS. 2 and 10, and assuming that the manual switch assembly 1 is turned to one of its operative positions, the reset signal and the electric power are fed respectively to the input terminals RST and $V_{DD}$. Simultaneously therewith, the various data words to be stored at respective addresses in the random access memory RAM are inputted through the A port and stored therein. Since these data words are related to the temperature control, they are indicative of the outdoor and indoor temperatures. The read-only memory ROM then determines whether or not all necessary data has been inputted to the random access memory RAM and, if the storing of data has not yet been completed, the read-only memory ROM commands that additional data be inputted into the random access memory RAM. On the other hand, if the input of all the necessary data into the random access memory RAM has been completed, then the next succeeding command is issued by the read-only memory ROM.

In other words, the command issued by the read-only memory ROM subsequent to the complete entry of the necessary data into the random access memory RAM serves to allow the entry of the data at the predetermined addresses in the random access memory RAM and to determine the position of the indoor temperature adjustment knob 1b. As illustrated, since the indoor temperature adjustment knob 1c is set at the notch number five, the uppermost and lowermost limits of the temperature range in which the air-conditioner operates under the ventilating mode are 20° C. and 23° C., respectively, as shown in FIG. 12. This information is stored at the predetermined address in the random access memory RAM through the B port by the command issued by the read-only memory ROM subsequent to the completion of entry of all of the necessary data into the random access memory RAM.

Assuming that the prevalent outdoor temperature is 18° C., the read-only memory ROM operates to determine if this outdoor temperature is equal to or higher than the heating required temperature, i.e., the temperature over which the air-conditioner is operated as a heat pump in the heating mode. As illustrated, since the outdoor temperature is lower than the required heating temperature which is assumed to be 20° C. when the adjustment know 1b is set to notch number five (as can readily be seen from the graph of FIG. 12, the read-only memory ROM generates a command indicating that the air-conditioner should operate in the heating mode. With this command, the drive components of the air-conditioner necessary to operate the latter in the heating mode are operated. More specifically, since the air-conditioner in this embodiment is of a type which can operates as a heat pump as hereinbefore described, the 4-way valve 5 is first energized to bring it into a position necessary to allow the coolant to flow in a direction shown by the arrow-headed solid lines in FIG. 15 to establish a heating cycle. Simultaneously therewith, the indoor fan motor 2, the compressor 3 and the outdoor fan motor 4 are all operated with the indoor heat-exchanger INb operating as a heater. Nevertheless, the supply of the electric power to these drive components 2, 3, 4 and 5 is effected through the associated relay switches R1 to R4.

The flow of the various signals in the micro-computer 8 is repeated and, therefore, the read-only memory ROM continues the comparison and determination of the data fed from the random access memory RAM and which may vary from time to time, so that the necessary drive components can receive commands appropriate to particular operating conditions. In the illustrated embodiment, since the knob 1b is set to notch number five, the heating of the house room continues until the indoor temperature attains the desired indoor temperature of 20° C. as shown in the graph of FIG. 12 and, once the house room has been heated to the desired indoor temperature of 20° C., the read-only memory ROM controls the drive components of the air-conditioner on the basis of the data fed from the random access memory RAM, thereby maintaining the indoor temperature approximately at 20° C. at all times. It is natural that the control of the indoor temperature during the heating mode with the knob 1b set to notch number five is accompanied with a slight fluctuation with respect to the desired indoor temperature of 20° C.

It is noted that the read-only memory ROM may store, at a predetermined address, a command necessary to energize the auxiliary electric heater 7 should the heat pump be unable to provide heat energies in an amount sufficient to raise the indoor temperature to the desired indoor temperature when the outdoor temperature is extremely low. Alternatively, the read-only memory ROM may store a command to energize the auxiliary electric heater 7 simultaneously with the start of the heating mode, so that the continuous heating of the house room can be effected even though the heat pump becomes unable to provide the necessary amount of heat energies due to the extremely low outdoor temperature. To control the heating capacity, any one of various known methods or means may be employed, an example of which is to intermittently stop the compressor 3 or to bypass the flow of the coolant. In this case, the read-only memory ROM stores, at a predetermined address the necessary control command, and accordingly, a fine control of the indoor temperature can be performed.

When the outdoor temperature raises, as the time passes, to a value higher than 20° C., for example 21° C., the pattern of flow of the signals then prevailing changes. In other words, the data regularly fed from the A port to the randon access memory RAM by the command from the read-only memory ROM varies and, accordingly, the contents of the command issued by the read-only memory ROM varies. This means that, even though the position of the adjustment knob 1b does not vary, that is, the knob 1c is still held at notch five, the method used to determine if the outdoor temperature is equal to or higher than the required heating temperature varies because the elevated outdoor temperature (21° C.) becomes higher than the required heating temperature as hereinbefore described, and the read-only memory ROM issues a command, stored at a predetermined address, to determine if the outdoor temperature of 21° C. is equal to or higher than the required cooling temperature (23° C. in this instance, as shown in the graph of FIG. 12). Since the fact is, however, that the outdoor temperature is still lower than the required cooling temperature, the read-only memory ROM generates a command from a predetermined address to operate the air-conditioner in the ventilating mode. It is noted that, up until the time that this command to operate the air-conditioner in the ventilating mode is issued, various signals flow. (For example, the flow of signals takes place so as to be addressed at the predetermined addresses where the command to operate the air-conditioner in the ventilating mode are stored. It is noted that the entry of data input into the random access memory RAM and the issue of commands from the read-only memory ROM are repeated in a manner similar to that occurring during the heating mode of operation of the air-conditioner as hereinbefore described.

In this way, the air-conditioner is brought into position to operate in the ventilating mode. More specifically, the command necessary to operate the air-conditioner in the ventilating mode, (which command is hereinafter referred to as "ventilating command"), issued by the read-only memory ROM in the manner described above emerges from the micro-computer 8 through the C port as is the case of the heating command to operate the air-conditioner in the heating mode. This ventilating command is used to operate the drive components which must be operated during the ventilating mode of operation of, the air-conditioner. In particular, the relay switches R2, R3 and R4 are opened to deenergize the compressor 3, the outdoor fan motor 4 and the 4-way valve 5 on one hand and the relay switch R5 is closed on the other hand to energize the ventilating device 6. It is noted that, because of the type of the ventilating device employed in the illustrated air-conditioner, the indoor fan motor 2 continues to be driven even during the ventilating mode of operation of the air-conditioner.

As the time further passes and when the outdoor temperature further raise to a value higher than the required cooling temperature (23° C.), for example, to 24° C., the data to be entered in the random access memory RAM varies in a manner similar to that occurring at the start of the ventilating mode as hereinbefore described and, therefore, the read-only memory ROM determines that the outdoor temperature is higher than the cooling required temperature. At this time, since the above described control continues, the temperature information, stored at the address of the random access memory RAM where the outdoor temperature is stored, varies. As a result thereof, in a similar manner as that occurring at the time of change from the heating mode to the ventilating mode, the read-only memory ROM, based on the different data stored in the random access memory RAM, determines in succession if the outdoor temperature (24° C.) is equal to or higher than the required heating temperature (23° C.) and if the outdoor temperature is equal to or higher than the required cooling temperature (23° C.). In the instance now under discussion, since the outdoor temperature is higher than the required cooling temperature, it is determined that the air-conditioner should be operated in the cooling mode.

The operation of the air-conditioner in the cooling mode will now be described.

Subsequent to the determination performed by the read-only memory ROM to operate the air-conditioner in the cooling mode, a determination is made as to the position of the manual-auto switch 1c. The determination of the position of the manual-auto switch 1c may be carried out simultaneously with the determination of the position of the indoor temperature adjustment knob 1b. Should the read-only memory ROM determine that the manual-auto switch 1c is set to the auto position (the manual position being described later), the read-only memory ROM commands the ALU to perform its calculating operation according to a predetermined formula as will be described later and the random access memory RAM stores the result of the calculation, which is the desired indoor temperature, for example, 23.3° C. as shown in the graph of FIG. 12.

Subsequent to the setting of the desired indoor temperature to which the house room is to be cooled, the read-only memory ROM, based on the input data of the random access memory RAM, generates a cooling command to deenergize the drive components which have been operated during the ventilating mode and to energize the drive components necessary to achieve the cooling mode of operation of the air-conditioner. Specifically, the 4-way valve is brought into a position to allow the coolant to flow in a direction shown by the arrow-headed broken lines in FIG. 15 and, simultaneously therewith, the compressor 3, the indoor fan motor 2 and the outdoor fan motor 4 are all operated with the associated relay switches closed by the command from the read-only memory ROM. Even the temperature control during the cooling mode fluctuates with respect to 23.3° C. In addition, even during the cooling mode, the read-only memory ROM repeatedly generates its commands in a manner similar to that occurring during the heating and ventilating modes.

In the foregoing description, the heating, ventilating and cooling modes of operation of the air-conditioner have been described as achieved one at a time when the outdoor temperature attains 18° C., 21° C. and 24° C., respectively. However, in practice, the indoor and outdoor temperatures vary from time to time and, accordingly, the desired indoor temperature may also vary in relation to variation of the outdoor temperature. In view of this, during any of the operating modes of the air-conditioner, it may be necessary to change the desired indoor temperature with due regards paid to the change in outdoor temperature. To achieve this, in the present invention, it is feasible to make the temperature control performed by the air-conditioner follow the characteristic curves as shown in FIG. 12 depending upon the position of the indoor temperature adjustment knob 1b.

The graph of FIG. 12 will now be described. During the heating mode with the adjustment knob 1b set to notch number five, it is generally considered sufficient to heat the room to 20° C. irrespective of the outdoor temperature. Accordingly, no adjustment of the desired indoor temperature is necessary and, therefore, the desired indoor temperature of a fixed value, that is, a generally acceptable value of 20° C., is stored at the predetermined address in the read-only memory ROM.

During the ventilating mode, since the desired indoor temperature is generally considered acceptable when it is within the range of 20° to 23° C., such temperature information need not be stored in the read-only memory ROM.

However, since the indoor temperature greatly fluctuates during the cooling mode and, particularly, a variation of the indoor temperature generally within the range of 23° to 35° C., as shown in FIG. 12, is likely to occur. However, since the indoor temperature of 27° C. is generally considered acceptable when the outdoor temperature is equal to or higher than, for example, 35° C., this fixed temperature value of 27° C. should be stored at the predetermined address in the read-only memory ROM so that the latter can issue the cooling command each time the indoor temperature becomes equal to or higher than 27° C.

The setting of a desired indoor temperature when the outdoor temperature is within the range of 23° to 35° C. is carried out in the following manner.

The relationship between the desired indoor temperature $T_2$ and the outdoor temperature $T_1$ when the latter is within the range of 23° to 35° C., which is shown in the graph of FIG. 12, can be expressed by the following equation:

$$T_2 = T_1/3 + 46/3$$

Accordingly, if the read-only memory ROM stores a command at its predetermined address indicating that, when the outdoor temperature is within the range of 23° to 35° C. and the air-conditioner is being operated in its cooling mode, the desired indoor temperature should be set according to the above described linear function, then the temperature in the house room can be maintained at the desired indoor temperature irrespective of whether or not the outdoor temperature varies within that range. Nevertheless, up until the desired indoor temperature is set in the manner described above, the micro-computer 8 repeats its calculating operation, the details of which are herein omitted for the sake of brevity.

In view of the above, even though the outdoor temperatures varies while the air-conditioner is operated in the cooling mode, the read-only memory continues to generate the command indicating that the desired indoor temperature stored at the predetermined address in the read-only memory ROM should be set. Therefore, the micro-computer 8 can calculate the desired indoor temperature immediately after the data is inputted incident to variations of the outdoor temperature, thereby setting the desired indoor temperature. In other words, since the read-only memory ROM controls the appropriate drive components to render the indoor temperature to be equal to the desired indoor temperature set by the random access memory RAM, the read-only memory ROM can generate a command necessary to drive the compressor 3 for a relatively long period of time where a relatively large cooling capacity is required.

The foregoing operation of the air-conditioner, including the heating, ventilating and cooling modes, is based on the characteristic curves shown in FIG. 12 and formulated so as to achieve the indoor climatic condition acceptable to most people when the indoor temperature adjustment knob 1b is set to notch number five. However, depending upon the type of people, some may not feel such an indoor climatic condition to be comfortable. Under this circumstance, the best remedy is to adjust the indoor temperature adjustment knob 1c to any one of the adjustment notches other than notch number five or to switch the manual-auto switch 1c to the manual position.

An example of the temperature control performed when the adjustment knob 1b is set to notch number nine will first be described.

As can readily be seen from the graph of FIG. 12, the desired indoor temperature to be achieved by the house room during the cooling and heating modes of operation of the air-conditioner is set to be of a minimum value which may arbitrarily be chosen, but which is, in the instance as shown, lower by 2° to 3° C. than the lowest desired indoor temperature to be achieved when the adjustment knob 1b is set to notch number five as described above. More specifically, whereas the required heating temperature and the required cooling temperature during the setting of the adjustment knob 1b to notch number five has been shown and described to be 20° C. and 23° C., respectively. They are respectively 17° C. and 20° C. during the setting of the knob 1b to notch number nine. Accordingly, during the setting of the knob 1b to notch number nine, the air-conditioner operates in the heating mode, when the outdoor temperature becomes 17° C. or lower, and operates in the cooling mode when the outdoor temperature becomes 20° C. or higher. The ventilating mode is established when the outdoor temperature falls within the range of from 17° C. to 20° C. It is noted that the cooling mode of operation of the air-conditioner during the setting of the knob 1b to notch number nine is such that the indoor temperature can be lowered to 25° C. at maximum when the outdoor temperature is equal to or higher than 35° C., which is lower by 2° C. than the lowest desired indoor temperature which can be attained under the same condition during the setting of the knob 1b to notch number five.

It is noted that the relationship between the desired indoor temperature $T_2$ and the outdoor temperature $T_1$ when the latter is within the range of 20° to 35° C. during the setting of the knob 1b to notch number nine can be expressed by the following equation:

$$T_2 = T_1/3 + 40/3$$

If the above described characteristic as shown by the above equation is stored at a predetermined address, the read-only memory ROM commands that data should be entered in the random access memory RAM and controls the necessary drive components on the basis of the data inputted to the random access memory RAM, in a manner substantially similar to that occurring during the setting of the adjustment knob 1b to notch number five. Even in this case, the read-only memory ROM continues to generate the commands repeatedly according to the program shown in FIG. 14.

Furthermore, even during the time when the outdoor temperature is within the range of 20° to 35° C., the micro-computer 8 continues its calculating operation according to the above mentioned linear function so that the necessary drive components can be operated to maintain the indoor temperature at the desired indoor temperature.

Another example of the temperature control performed during the setting of the knob 1b to notch number one will now be described.

The desired indoor temperature to be achieved during the setting of the knob 1b to notch number one may also be chosen arbitrarily, but is, in the instance as shown, chosen to be a value lower by 2° C. than the prevalent outdoor temperature. More specifically, the desired indoor temperature to be achieved during the heating mode is set to be 27° C. whereas the desired indoor temperature to be achieved during the cooling mode is set to be within the range of 25° to 32° C. depending upon the outdoor temperature as can readily be seen from the graph of FIG. 12. It is noted that, during the setting of the knob 1b to notch number one, no ventilating mode is performed. In other words, since the air-conditioner operates in the heating mode when the outdoor temperature becomes 24° C. or lower while it operates in the cooling mode when the outdoor temperature becomes 27° C., no drive components of the air-conditioner operate when the outdoor temperature falls within the range of 24° to 27° C. This is because it appears that an indoor climatic condition acceptable to those who consider it reasonable to set the knob 1b to notch number one can be created without the air-conditioner being operated under the ventilating mode. Nevertheless, the range of the outdoor temperature during which the air-conditioner ceases its operation can be narrowed if desired.

It is noted that the relationship between the desired indoor temperature $T_2$ and the outdoor temperature $T_1$ when the latter is within the range of 20° to 35° C. during the setting of the knob 1b to notch number one can be expressed by the following equation:

$$T_2 = 7T_1/8 + 245/8$$

In the above formula, the coefficient of $\frac{7}{8}$ may be approximated by one. To those who consider it reasonable to set the knob 1b to notch number one in creating the acceptable indoor climatic condition, the air-conditioner temperature control according to the above mentioned linear function appears feasible.

If the above described characteristic as shown by the above equation is stored at predetermined address in the read-only memory ROM, the read-only memory ROM commands that data should be entered in the random access memory RAM and controls the necessary drive components on the basis of the data inputted to the random access memory RAM, in a manner substantially similar to that described hereinabove. Even in this case, the read-only memory ROM continues the generation of the commands repeatedly according to the program shown in FIG. 14.

Furthermore, even during the time when the outdoor temperature is within the range of 27° to 35° C., the desired indoor temperature is occasionaly set according to the above mentioned primary function in a manner substantially similar to that during the setting of the knob 1b to notches number five and nine and the read-only memory ROM operates to control the various drive components.

It is to be noted that the air-conditioner operates in a manner similar to that described hereinbefore described even when the adjustment knob 1b is set to any one of the other notches not mentioned in the foregoing description. In any event, the important thing to note is to select the individual characteristics such that the curves represented respectively by the above mentioned primary functions do not intersect with each other. In addition, it is to be noted that the coefficient of each of the linear functions may not be limited to that described, but may be of a value between ⅞ and ⅓ so far as the setting of the knob 1b to any one of notches number two to number four are involved. In this case, the increase of the notch number should correspond to the decrease of the value of the coefficient.

The operation of the air-conditioner when the manual-auto switch 1c is set to the manual position will now be described with particular reference to FIG. 13. The manual temperature control capability which can be performed when the manual-auto switch 1c is set to the manual position is similar to that conventionally performed with the prior art air-conditioner and is based on the absolute temperature control principle.

So far illustrated in FIG. 13, the desired indoor temperature to be attained under the manual temperature control capability is, although there is no particular reason, selected to be 20° C. during the setting of the knob 1b to notch number five because the conventional pressureoperated thermostat is frequently operated at 20° C. during the heating of the house room. The desired indoor temperature to be attained under the manual temperature control capability during the cooling of the house room is similarly selected to be 24° C. so far as the setting of the knob 1b to notch number five is involved. The desired indoor temperature to be attained during the setting of the knob 1b to any one of the other notches may suitably be selected. In addition, so far as the graph of FIG. 13 is involved, no ventilating mode is provided, but if desired, it may be provided.

Accordingly, if such a characteristic as shown in FIG. 13 is stored at a predetermined address in the read-only memory ROM, the latter can, immediately when the data associated with the manual temperature control capability is inputted in the random access memory RAM, command that the indoor temperature should be raised or lowered to the desired indoor temperature, thereby controlling the necessary drive components on the absolute temperature control principle well known to those skilled in the art. Though a similar control takes place, wherever the knob 1b is set, by the command from the read-only memory ROM, the address of the read-only memory ROM from which an appropriate command necessary to control the drive components varies depending upon the position of the knob 1b to which the latter is set.

The desired indoor temperature to be attained under the manual temperature control capability during the heating mode is selected to be a suitable value in a manner similar to that selected for the automatic temperature control capability as hereinbefore described, but it may be of any suitable temperature other than that shown in the graph of FIG. 13. However, if the desired indoor temperature for the automatic temperature control capability is concurrently used for the manual temperature control capability, the number of steps of the program stored in the micro-computer can be minimized. In this case, the heating mode is performed in a manner similar to that under the automatic temperature control capability and, more specifically, in such a manner that, when the outdoor temperature becomes equal to the heating required temperature, the heating mode is interrupted and, when the outdoor temperature subsequently elevates to the cooling required temperature, the heating mode can be switched over to the cooling mode. At this time, the outdoor temperature is 27° C. and the desired indoor temperature is selected to be 24° C., which is somewhat lower than that under the automatic temperature control capability. Even when the air-conditioner starts the cooling mode, the commands and determinations are carried out in a manner similar to that described hereinbefore and, particularly, according to the program shown in FIG. 14. Referring to FIG. 14, under the manual temperature control capability, the read-only memory ROM makes a decision as to whether the manual-auto switch 1c is set to the auto position or whether it is set to the manual position and, when it has been found that the switch 1c is set to the auto position, causes the random access memory RAM to store at the predetermined address the desired indoor temperature (24° C.) corresponding to the setting of the adjustment knob 1b to notch number five. Subsequently, the calculation is performed to find the difference between the desired indoor temperature and the prevalent indoor temperature and, depending upon the result of the calculation, the read-only memory ROM generates the command necessary to drive the drive components of the air-conditioner.

The flow of the signals in the manner as hereinbefore described is repeated to maintain the indoor temperature equal to the desired indoor temperature. So far as the setting of the adjustment knob 1b to notch number five, there is no fixed desired indoor temperature to be attained when the outdoor temperature falls within the range of 20° to 27° C. However, it may be possible to devise an arrangement such that the operation of the air-conditioner is interrupted when the outdoor temperature falls within the range of from 20° to 27° C. or that the ventilating device is operated when the outdoor temperature falls within the range of from 20° to 27° C.

Except that the type of commands indicative of the desired indoor temperature generated from the read-only memory ROM varies depending upon the position of the knob 1b, the operation similar to that has been described as occurring during the setting of the knob 1b to notch number five under the manual temperature control capability takes place even when the knob 1b is set to any of the other notches. Nevertheless, the desired indoor temperature to be attained during the setting of the knob 1b to any of the other adjustment notches may be selected as desired and, in addition, the position of the adjustment knob 1b relative to a particular notch may be selected as desired.

In any event, with the system of the present invention, the setting of the adjustment knob 1b to notch number five enables the air-conditioner to create an indoor climatic condition acceptable to most people at all times. This can be achieved, when the switch 1c is set to the auto position, merely by setting the knob 1b to notch number five at the time when the air-conditioner is initially operated. Should some people feel that the indoor climatic condition created during the setting of the knob 1b to notch number five is not acceptable, they may set the knob 1b to one of the other adjustment notches or to switch the manual-auto switch 1c over to the manual position, thereby controlling the air-conditioner so as to create a different indoor climatic condition that is acceptable to them. In this way, the system of the present invention should be acceptable to all types of people because of the minimized possibility of excessive heating or cooling and/or because of the minimized consumption of expensive natural resources, particularly, electric energy. Furthermore, since the control panel is provided with an indicator such as that comprised of the indicator lamps L1, L2 and L3, the user of the air-conditioner embodying the present invention can be visually informed of the operating mode under which the air-conditioner is then being operated.

Although the present invention has fully been described in connection with the preferred embodiment thereof with reference to the accompanying drawings, it is to be noted that various changes and modifications are apparent to those skilled in the art. By way of example, although the present invention has fully been described as applied to the air-conditioner of the type which can serve as a heat pump, the concept of the present invention can equally be applicable to any other type of air-conditioner of a type, for example, provided with a heating device separately of the air-conditioner.

Accordingly, such changes and modifications are to be understood as included within the true scope of the present invention unless they depart therefrom.

What is claimed is:

1. A temperature control apparatus which comprises, in combination, an outdoor temperature detector for detecting the outdoor temperature of the outside of a space to be air-conditioned, an indoor temperature detector for detecting the indoor temperature in the space to be air-conditioned, a storage device for storing a plurality of desired indoor temperatures each of which is expressed by a linear function of the outdoor temperature and for storing a plurality of desired indoor temperatures each comprised of a fixed value, a comparing means operatively connected to and responsive to said indoor and outdoor temperature detectors and said storage device for comparing the detected indoor temperature with a selected one of said desired indoor temperatures, and a control device operatively connected to and responsive to said comparing means for controlling the operation of an air-conditioning apparatus;

wherein said storage device stores the linear function of (y=ax+b), wherein a represents a coefficient and b represents a constant and x represents the outdoor temperature and y represents the desired indoor temperature, said coefficient and constant being varied by manipulating an indoor temperature adjustment to any one of a plurality of adjustment notches;

and wherein means are provided for switching between any one of said plurality of desired indoor temperatures comprised of a fixed value, corresponding to the indoor temperature adjustment notches, and any one of said plurality of desired indoor temperature expressed by the linear function and corresponding to the indoor temperature adjustment notches.

2. A temperature control apparatus which comprises, in combination, an outdoor temperature detector for detecting the outdoor temperature of the outside of a space to be air-conditioned when the apparatus is operated in one of either a cooling mode and a heating mode, an indoor temperature detector for detecting the indoor temperature in the space to be air-conditioned when the apparatus is operated in one of either said cooling mode and said heating mode, a storage means for storing a plurality of first desired indoor temperatures to be attained during said cooling mode, each of said plurality of first desired indoor temperatures expressed by a primary function proportional to a change in the detected outdoor temperature, and for storing a plurality of second desired indoor temperatures each comprising a fixed absolute value, means operatively connected to and responsive to said outdoor temperature detector and said indoor temperature detector for comparing said detected indoor temperature with a selected one of said first and second desired indoor temperatures, said comparing means responsive to said detected outdoor temperature when comparing said indoor temperature with a selected one of said desired first indoor temperatures, and a control device operatively connected to and responsive to said comparing means for controlling the operation of an air-conditioning apparatus to enable said detected indoor temperature to be equal to said selected one of said plurality of first and second desired indoor temperatures.

3. A temperature control apparatus as claimed in claim 2, wherein said storage means stores the linear function of (y=ax+b), wherein "a" represents a coefficient and "b" represents a constant and "x" represents said detected outdoor temperature and "y" represents said selected one of said plurality of first desired indoor temperatures, said coefficient and constant being varied by manipulating an indoor temperature adjustment to any one of a plurality of adjustment notches.

4. A temperature control apparatus as claimed in claim 2, wherein means are provided for switching between one of said first plurality of desired indoor temperatures.

5. A temperature control apparatus as claimed in claim 2, wherein means are provided for switching between one of said first plurality of desired indoor temperatures and one of said second plurality of desired indoor temperatures.

6. A temperature control apparatus which comprises a control for controlling an air-conditioning apparatus to operate in one of either a cooling mode and a ventilating mode by detecting the indoor temperature in a space to be air-conditioned in comparison to the outdoor temperature outside of said space to be air-conditioned;

wherein said control comprises an outdoor temperature detector for detecting the outdoor temperature of the outside of the space to be air-conditioned when an air-conditioning apparatus is operated in one of either said cooling mode and said ventilating mode, an indoor temperature detector for detecting the indoor temperature when the air-conditioning apparatus is operated in one of either said cooling mode and said ventilating mode, a storage means for storing a plurality of first desired indoor temperatures to be attained during one of either said cooling mode and said ventilating mode, each of said first desired indoor temperatures being expressed by a linear function proportional to a change in said outdoor temperature, a comparing means responsive to said outdoor temperature detector for comparing the detected indoor temperature with the desired indoor temperature relative to said detected outdoor temperature, and a control unit responsive to said comparing means to control the operation of the air-conditioning apparatus in one of either said cooling mode and said ventilating mode to enable said detected indoor temperature to be equal to a selected one of said plurality of first desired indoor temperatures.

7. A temperature control apparatus as claimed in claim 11, wherein means are provided for switching between one of said plurality of first desired indoor temperatures and one of a plurality of fixed second desired indoor temperatures respectively corresponding to one of a plurality of adjustment notches of a manual indoor temperature adjustment.

8. A temperature control apparatus as claimed in claim 6, wherein a predetermined range of outdoor temperatures includes a predetermined range required for said air-conditioning apparatus to be operated in a heating mode, said air-conditioning apparatus operating in the heating mode when said control detects an indoor temperature falling within a predetermined range required for the air-conditioning apparatus to be operated in said heating mode.

9. A temperature control apparatus which comprises a control for controlling an air-conditioning apparatus to operate in one of either a cooling mode and a ventilating mode by detecting the indoor temperature in a space to be air-conditioned in comparison to the outdoor temperature outside of said space to be air-conditioned;

further comprising in combination:

an outdoor temperature detector for detecting the outdoor temperature of the outside of a space to be air-conditioned during one of either a cooling mode, a ventilating mode, and a heating mode of operation of said air-conditioning apparatus;

an indoor temperature detector for detecting the indoor temperature in the space to be air-conditioned during one of either the cooling mode, the ventilating mode, and the heating mode of operation of said air-conditioning apparatus;

a storage means for storing a plurality of first desired indoor temperatures to be attained during the cooling mode of operation of the air-conditioning apparatus, each of said first desired indoor temperatures expressed by a linear function which is proportional to at least a change in said outdoor temperature, and for storing a plurality of second desired indoor temperatures to be attained during the heating mode of operation of said air-conditioning apparatus and each comprised of a fixed value;

a comparing means operatively connected to and responsive to said storage means for comparing said detected indoor temperature with a selected one of said desired indoor temperatures; and a control means for controlling the operational mode of said air-conditioning apparatus in response to said comparing means to enable said detected indoor temperature to be equal to said selected one of said desired indoor temperatures.

10. A temperature control apparatus which comprises, in combination:

a control unit for selectively operating an air-conditioning apparatus in one of either a heating mode and a cooling mode until the indoor temperature in a space to be air-conditioned attains a predetermined desired indoor temperature;

a storage means for storing a first critical temperature at which said control unit operates said air-conditioning apparatus in a heating mode and a second critical temperature at which said control unit operates said air-conditioning apparatus in a cooling mode;

means for detecting the outdoor temperature outside of the space to be air-conditioned and the indoor temperature in said space;

means for comparing the indoor temperature detected by said detecting means with one of either the first critical temperature and the second critical temperature;

means for controlling the operation of the air-conditioning apparatus according to the result of comparison made by said comparing means;

each of said first and second critical temperatures stored in said storage means being respectively comprised of a plurality of desired indoor temperature values, the plurality of desired indoor temperature values of said first critical temperature being fixed values, and the plurality of desired indoor temperature values of said second critical temperature being, when the indoor temperature is within a predetermined range required for the air-conditioning apparatus to operate in the cooling mode, of a value expressed by a linear function proportional to a change in said outdoor temperature; and said control unit including an indoor temperature adjustment having a plurality of adjustment notches for varying the desired indoor temperature to which the space is to be air-conditioned.

* * * * *